May 1, 1951 M. WEBER 2,551,192
SEED HANDLING ASSEMBLY FOR POTATO PLANTERS
Filed April 19, 1948 3 Sheets-Sheet 1

Inventor
Millard Weber

By Clarence A. O'Brien
and Harvey B. Jacobson
Attorneys

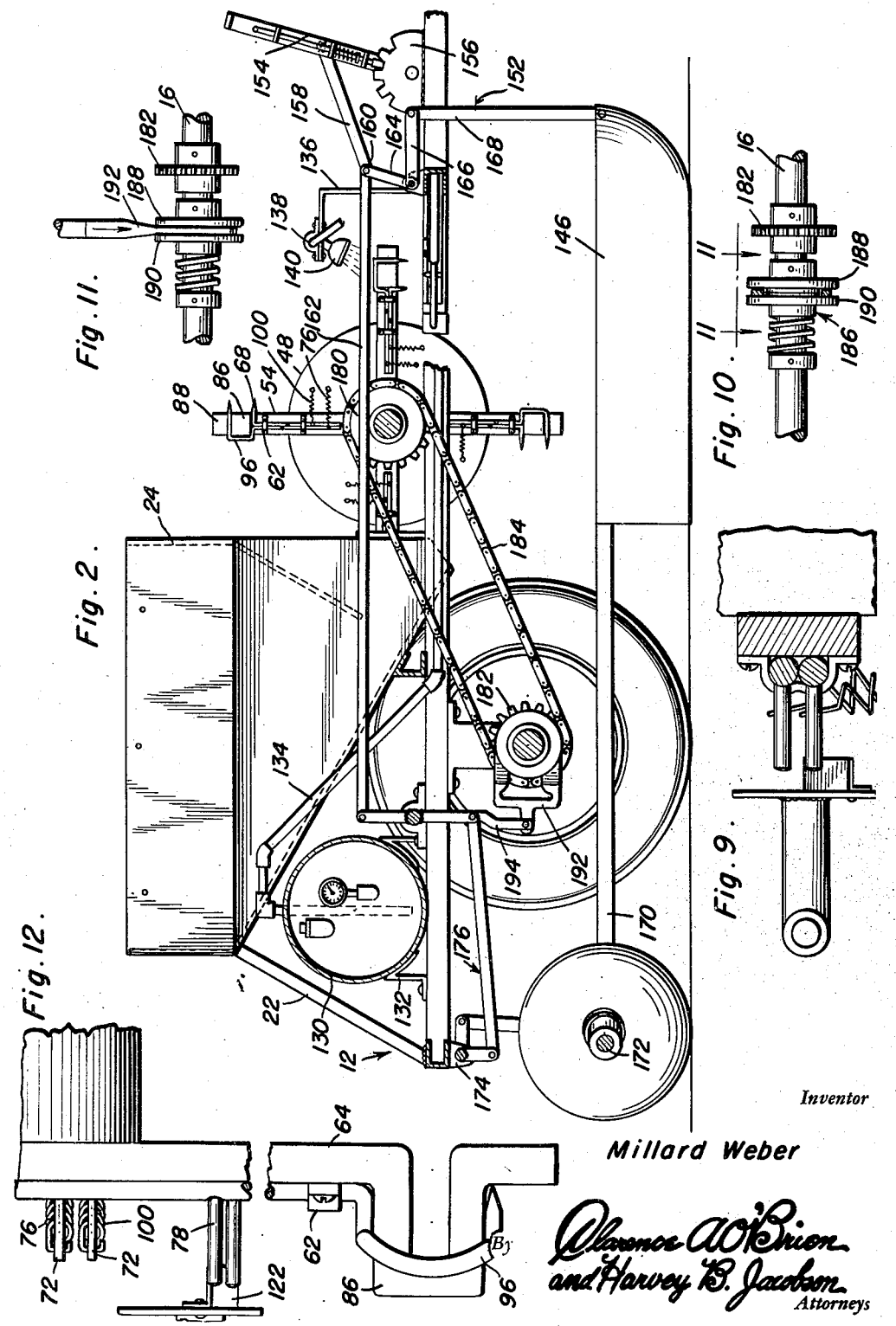

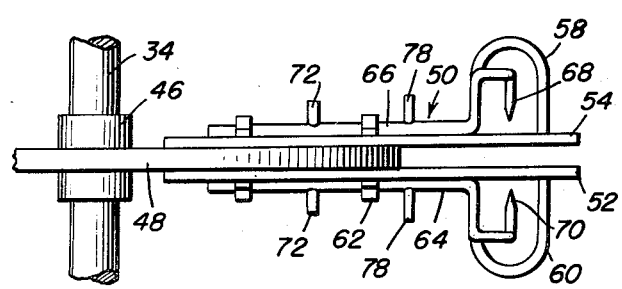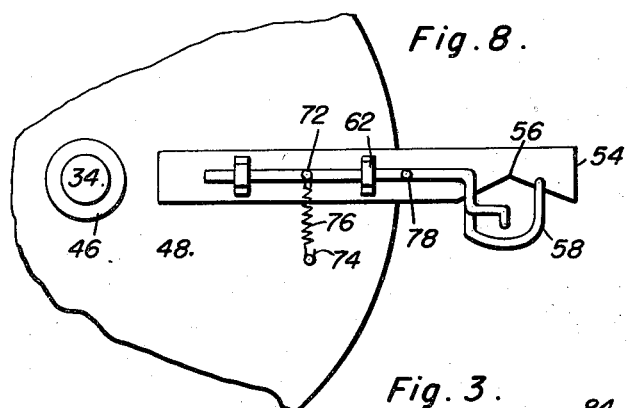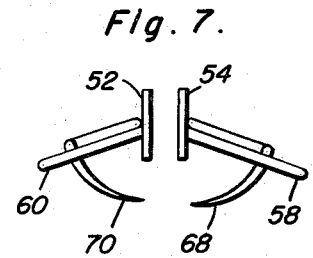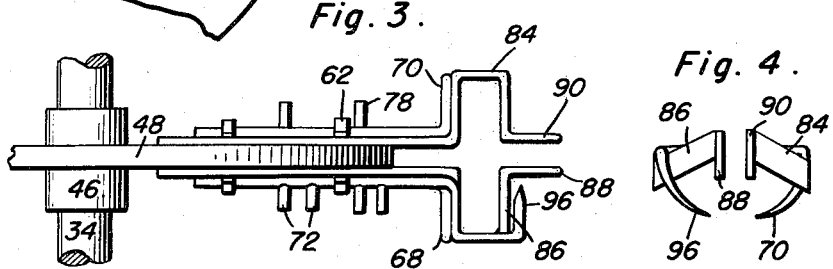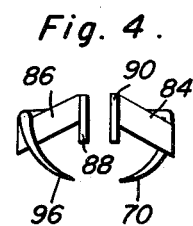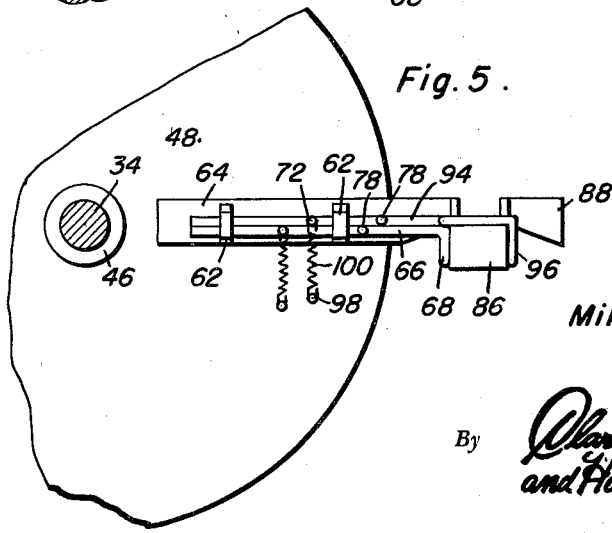

Patented May 1, 1951

2,551,192

UNITED STATES PATENT OFFICE 2,551,192

SEED HANDLING ASSEMBLY FOR POTATO PLANTERS

Millard Weber, Gering, Nebr.

Application April 19, 1948, Serial No. 21,870

10 Claims. (Cl. 146—59)

This invention relates to potato planting machines of the type wherein seed potatoes are removed from a hopper, sliced and placed in the ground during advance of the machine, and has for its primary object to improve the manner in which the seed potatoes are handled and treated during this operation.

Another important object of the invention, in conformity with the primary object, is to positively engage a seed potato and move the same from the hopper to a position for planting and to also prevent the potato from becoming infected during such movement and the slicing thereof.

Another important object of the present invention, in accordance with the preceding objects, is to impale a seed potato between relatively movable members during transit of the same from the hopper, and to accomplish such impalement and release of the same automatically at predetermined positions.

A meritorious feature of this invention resides in the provision of improved gripping prongs, the mounting thereof and the means whereby they are adapted to remove potatoes individually from the hopper, to advance them to a stationary blade, and to successively release the segments into ground placement.

Another meritorious feature of this invention resides in the provision of a linkage system, whereby the plow shoes and disks may be withdrawn from ground engagement and the belt transmission for operating the potato-gripping means may be rendered inoperative.

These and ancillary objects and other meritorious features are attained by this invention, a preferred embodiment of which is set forth in the following description and illustrated in the accompanying drawings, wherein:

Figure 2 is a side elevational view thereof;

Figure 3 is a top plan view of one embodiment of the potato-gripping and planting means;

Figure 4 is a front elevational view of Figure 3;

Figure 5 is a side elevational view thereof;

Figure 6 is a top plan view of a modified form of potato-gripping and retaining fingers or prongs;

Figure 7 is a front elevational view thereof;

Figure 8 is a side elevational view thereof;

Figure 9 is an enlarged fragmentary view of the automatic means provided to disengage the prongs and remove the potato segments therefrom;

Figure 10 is a fragmentary view of the clutch means provided for disengaging the belt transmission system;

Figure 11 is a view taken substantially on the plane of line 11—11 of Figure 10; and Figure 12 is an enlarged fragmentary view of one of the potato-engaging and retaining prongs.

Figure 1:
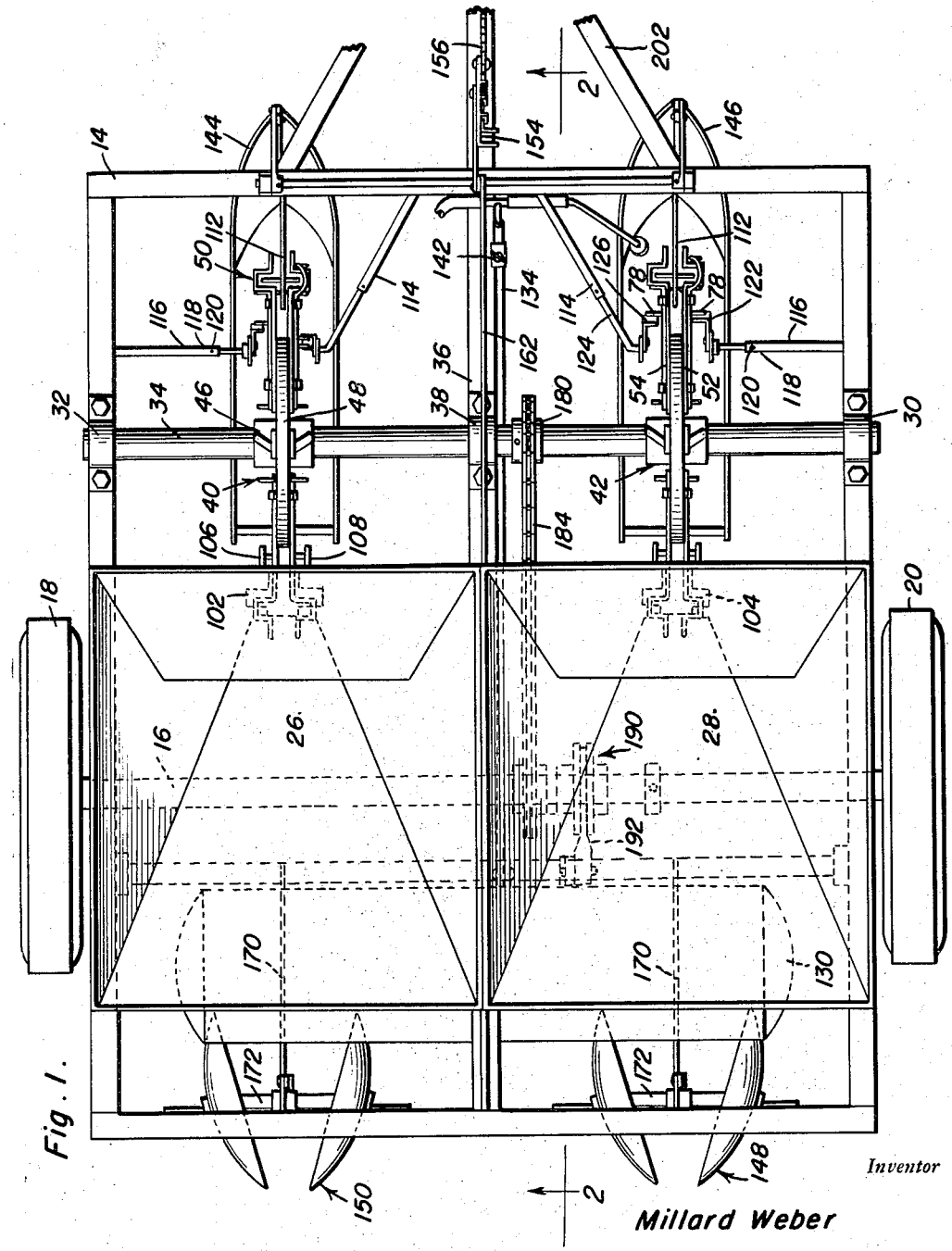
Figure 1 is a top plan view of a potato cutter and planter, constructed in accordance with the principles of this invention and adapted to be drafted by a powered unit.

Referring now more particularly to the drawings wherein similar characters of reference designate corresponding parts throughout, this invention, generally designated by the reference numeral 12, comprises a substantially rectangular frame 14 which is supported on an axle 16, having wheels 18 and 20, the same being joined conventionally. Mounted on the frame 14 by means of standards 22, which may be suitably secured as by bolt assemblies, welding or the like, is a hopper 24. The hopper 24 is divided into a pair of adjacent discharging bins 26 and 28. Journaled in front of the discharging bins 26 and 28 by means of the U-shaped bearing brackets 30 and 32 which are secured to the sides of the frame is a shaft 34. A longitudinal support bar 36 extends between the sides of the frame, projecting forwardly thereof. A bearing bracket 38 mounted thereon aids in the support of the shaft 34.

Received on the shaft 34 for rotation therewith are a pair of potato planting devices 40 and 42. The potato planters 40 and 42 are disposed in advance of the discharge bins 26 and 28 and are adapted to remove individual potatoes from the bins and to convey them into ground placement. The devices 40 and 42 are similarly designed and constructed, and it is believed that a description of one will suffice. Accordingly, the device 40 comprises a collar 46, which is keyed on the shaft to rotate therewith. A disk-shaped member 48 is integrally formed with the collar 46 and is adapted to support a plurality of radially disposed potato-gripping arms 50. The potato-gripping arms 50 comprise a pair of parallel bars 52 and 54, which are secured by any suitable securing means, such as bolts, screws or the like, to the disk. The opposed parallel arms 54 and 52 radially extend from the disk and are equidistantly disposed thereon. The forward or free ends of the bars 52 and 54 have arcuate notches or cut-out portions 56 disposed in the top edge thereof. Outwardly and upwardly inclined U-shaped rods 58 and 60 extend from the top edge of the bars, adjacent the arcuate notches. The U-shaped rods 58 and 60, in association with the arcuate notches 56, are adapted to seat a potato or seed potato. Secured to the outer sides of the bars 54 and 52 by brackets 62 are pivoted stems or rods 64 and 66. The stems 64 and 66 have angular inturned prong terminals 68 and 70, which are adapted to penetrate a potato. The opposite ends of the rods 64 and 66 have an extending pin 72 which is connected to a restraining lug 74, on the disks 48, by resilient means 76. The resilient means 76 serves to normally retain the prong ends 70 and 68 in an inwardly directed coactive placement, in penetrating and retaining a potato. Extending integrally from the rods 64 and 66 are release pins 78. The release pins, in association with release means carried by the frame, move the prongs 68 and 70 outwardly from their impalement, as will be later described.

With reference to Figures 3–5, inclusive, of the drawings, another form of potato penetrating and engaging rods is shown. In the modified form shown in these views, the bars 52 and 54 have an integral U-shaped offset portion 84 and 86 formed adjacent the parallel extending ends 88 and 90. The rods 64 and 66 have their angularly offset and inwardly terminating penetrating prongs 68 and 70 disposed on the inner side of the offsets 84 and 86. A third bar 94 is secured by the bracket 62 adjacent to the bar 66. The angular U-shaped potato-engaging pick 96 of the bar 94 terminates in front of the U-shaped portion 86. Similar release pins 78 are provided integrally on the bar and a normal placement pin 72 is provided in association with a lug 98, a spring being connected therebetween.

Disposed in the forward inclined bottom of the bins 26 and 28 are discharge openings 102 and 104, within which the prongs or picks and the free ends of the bars are adapted to travel. Extending from the bins, adjacent the openings therein, are a pair of parallel plates 106 and 108. The release pins 78 which extend in opposite directions from the rods 64 and 66 and also 94 will abut the bottom edge of the plates as the shaft 34 is rotated, rotating the disk 48. Engagement of the release plates 106 and 108 by the release pins will move the prong or pick ends 68 and 70 or 96 outwardly, as the assembly enters the bin openings 102 and 104. Thus, a potato received on the extended end of the bars, in the rods 58 and 60 or the rod portions 84 and 86, will be pierced by the prong ends of the rods 64, 66 and 94, when the release pins move out of the range of the release plates and the resilient means 76 biases or urges the pins 72 inwardly.

Disposed in the path of travel of the arms 50 are crossed blades 112, which quarter the potato or seed potato as the potato is moved through the blades by the arms.

Extending inwardly from the frame 14 are adjustable release means 114 and 116. The release means 114 and 116 are adapted to successively engage the release pins 78 and allow the segments of the potatoes to fall to the ground. The release means 116 extend inwardly laterally from the closed sides of the frame and comprise telescopic tubes 118, having adjusting means and securing means, such as a set screw 120, or the like. Extending from the inner face of the telescopic tubes 118 is an angle iron or member 122, which, as seen in Figure 1 of the drawings, is disposed in the path of travel of the release pins 78. The release means 114 are similarly formed from telescopic tubes 124. The extending end of the inner tube is angularly bent in order to position the release plate 126 in the path of travel of the rod release pin 78.

Means is provided for cleansing and disinfecting the blades 112 during and prior to the individual cutting operation. The means preferred may comprise any type of disinfecting or sterilizing fluid, which may be suitably sprayed on the blades. For this purpose, by way of example, a tank 130 is retained on the rear portion of the frame by suitable support brackets or standards 132. A tubular connection 134 extends from the tank forwardly, along the medial bar 36, and is connected to an upwardly extending bracket 136. The tube 134 is bracketed by an angular bracket 138 to the end of the bracket 136 and terminates in a spray nozzle 140. The spray nozzle 140 is positioned over the blades 112, in order to spray the fluid from the tank 130 onto the blades. A valve 142 is provided in the tubular connection 134 and controls the admission of the fluid to the spray nozzle 140. Of course, conventional means, such as compressed air or the like, may be utilized to advance the fluid from the tank through the tube.

Suitable means is provided for opening the ground in advance of the potato segments, which are allowed to drop onto the ground by the contact of the release pin 78 with the release plates 122 and 126. Also, means is provided for covering the potato segments, after they have been placed in the ground. The means preferred for accomplishing the foregoing objects comprises a pair of shoe plows 144 and 146, the same being positioned underneath and in advance of the arms 50. A pair of complementary disks 148 and a similar pair 150 are disposed at the rear of the frame in longitudinal alignment with the shoes 144 and 146 and serve to cover the furrows formed by the shoes. Of course, suitable means may be provided for raising the plows and disks out of ground engagement, when the planter 12 is being transported to the operation locale. The means preferred comprises a linkage system, generally designated by the numeral 152. The linkage system comprises a manually operated lever 154, which is pivoted to a ratchet 156, the ratchet being mounted on the extending end of the central support 36. A bar 158 is pivoted at one end to the lever 154 and commonly pivoted, as at 160, to a longitudinal bar 162 and a connecting bar 164. The bar 160 is pivotally connected by a connecting bar 166 to the shoe raising bar 168. A rigidifying and aligning bar 170 is secured between the disk axle 172 and the plow shoes. A bracket 174 depending from the rear portion of the frame 14 supports a connecting linkage 176 which is pivoted to the longitudinal operating bar 162. Thus, it can be seen that when the lever 154 is moved rearwardly, the plow shoes and disks are moved out of ground engagement. Of course, a pawl or the like may be provided to lock the implements in said inoperative placement.

Conventional means is provided for rotating the shaft 34 and the appurtenant potato-engaging devices 50, and generally comprises a sprocket 180 which is secured on the shaft 34 and a sprocket 182 which is secured on the axle 16. A chain 184 communicates between the sprocket 182 and the sprocket 180, transmitting the power to the shaft 34. A clutch 186 is provided for controlling the transmission of rotating power to the shaft 34. The clutch 186 comprises a pair of clutch plates 188 and 190. A cam 192 is pivoted to a bar 194, the bar 194 being pivoted by means of a linkage system to the longitudinal operating bar 162. The cam is disposed between the clutch plates 188 and 190 and, as shown in Figure 11 of the drawings, serves to spread the clutch plates apart upon backward movement of the lever 154.

Thus, movement of the lever renders the planting machine operative or inoperative, as desired, forward movement of the lever positioning the plow and the disks in ground engagement and rotating the potato-engaging devices. Thus, it can be seen that there is provided a planter which will transport over the planting locale seed potatoes in whole form, the potatoes being retained in the hopper mounted on the machine. As the potatoes roll from this hopper to the smaller bins 26 and 28, they are picked up by the devices 50, the prongs 68 and 70 piercing the potatoes and retaining them on the seats formed in association with the extending ends of the bars. As the powered unit, such as a tractor or the like, is propelled over the ground, it moves the planting machine through the medium of a hitch 202. Movement of the planting machine is transmitted through the shaft 34, and coincidentally and correspondingly rotation is imparted to the potato-engaging and retaining devices. Thus, the potatoes are individually conveyed to the blades 112, which, as desired, may quarter or halve the potatoes. The segments of the sliced potatoes are held by the prongs or picks and are dislodged, one at a time and successively, by the cam or plate 122 and 126, which engages the release pins. It is to be noted that as the prongs are removed from the potatoes, the segments are momentarily retained by the forward terminating portions of the bars.

As the planting machine is moved over the ground, the ground is opened by the plow shoes to receive the potato segments, the same dropping into the furrows in orderly placement and consecutive order. The following disks 148 and 150 serve to cover the furrow and complete the planting. Of course, during the entire operation, the disinfecting spray is sprayed under pressure onto the blades in order to insure germ-proof seeds.

Thus, it can be seen that the entire potato-planting operation is performed by one machine, which is simple of operation and which avoids unnecessary operations, delays and expense ordinarily attendant with such planting. Further, it is to be noted that no auxiliary distributing unit or planting assembly is required, as the potato seed is handled, cut and planted in one operation.

However, since many other purposes and objects of this invention will become apparent to those skilled in the art, upon a perusal of the foregoing description in view of the accompanying drawings, it is to be understood that certain changes may be effected therein, as coming within the spirit of the invention and within the scope of the appended claims.

Having described the invention, what is claimed as new is:

1. In combination with a potato planting machine having a potato retaining hopper, a multi-arm member rotatably mounted adjacent the hopper for travel through the hopper, a pair of stems each of which is pivotally mounted on the member for rotation about an axis perpendicular to the axis of rotation of the member, said stems being parallel and spaced axially of said member, laterally offset prongs carried by the stems, said prongs being in opposed relation and adapted to cooperatively pierce and retain a potato upon rotation of the stems, release pins on said stems, adjustable releasing plates disposed in the path of travel of the pins for successively engaging the pins and rotating the stems upon further rotation of the member to move the prongs apart, means at the hopper for engaging the pins to move the prongs apart, and means for normally urging the prongs towards each other to pierce a potato therebetween.

2. The combination of claim 1 including means carried by said arms for removing an impaled potato from the prongs upon movement of the prongs away from each other.

3. The combination of claim 1 including a cutter disposed adjacent the path of said arms for acting upon a potato carried thereby, said cutter being angularly disposed between the plates and the first-mentioned means with respect to the axis of the member, whereby a potato is held by the prongs under the influence of the last-mentioned means while being cut.

4. In combination with a potato planting machine having a potato hopper provided with a discharge opening, a member rotatably mounted adjacent the hopper, a plurality of circumferentially spaced, radially extending arms carried by said member, means carried by each of said arms for engaging a potato at the discharge opening and for holding the potato during further rotation of the member, said means including a radially extending elongated stem mounted on one of the arms in substantially parallel relation thereto for rotation about its longitudinal axis, a transverse and laterally offset prong carried by said stem, said one arm being provided with means adjacent the prong affording a seat for a potato thereon, resilient means urging rotation of the stem to move the prong towards the last mentioned means, and means responsive to rotation of said member through a predetermined angular position in which said arm is adjacent the discharge opening to rotate the stem in opposition to said resilient means.

5. The combination of claim 4, wherein the last stated means includes a laterally projecting release pin on the stem adapted to strike a stationary release element.

6. In a potato planting machine, a rotatably mounted member having radially extending arms thereon, a pair of parallel elongated stems each of which is rotatably mounted on the member for rotation about its longitudinal axis, said stems being disposed in radially extending relation with respect to the axis of rotation of said member and spaced from each other with respect to the axis of the member, laterally offset potato engaging means carried by each of the stems, said means being selectively movable towards and away from each other by rotation of the stems, resilient means urging rotation of the stems to move the means towards each other to engage a potato therebetween, a laterally extending pin on each of the stems, release means disposed in the travel path of said pins, said pins being responsive to engagement with the release means during rotation of the member to rotate the stems in opposition to the resilient means.

7. The combination of claim 6, wherein said potato engaging means comprises a transverse and laterally offset prong secured to each of the stems, said prongs extending towards each other.

8. The combination of claim 7, wherein said stems are parallel and disposed in identical angular relation with respect to the axis of rotation of the member.

9. In a potato planting machine, a member mounted for rotation, a pair of radially extending arms carried by the member, said arms being spaced with respect to the axis of rotation of said member, a U-shaped element carried by each of the arms, said elements opening in opposed relation to each other, a pair of elongated stems each of which is rotatably mounted on one of the arms for rotation about its longitudinal axis, said stems being disposed in radially extending relation with respect to the axis of rotation of said member and being spaced from each other with respect to the axis of said member, a transverse and laterally offset prong secured to each of said stems adjacent the U-shaped elements, said prongs extending towards each other and being selectively movable towards and away from each other by rotation of the stems, resilient means biasing the prongs towards each other, and means for moving the prongs against the action of said resilient means including pins extending laterally from the stems and release elements disposed in the travel path of said pins.

10. The combination of claim 9, including potato cutting means disposed adjacent the travel path of the elements so as to pass between said elements and said prongs during rotation of the member.

MILLARD WEBER.

REFERENCES CITED

The following references are of record in the file of this patent:

UNITED STATES PATENTS

| Number | Name | Date |
|---|---|---|
| 596,343 | Topp | Dec. 28, 1897 |
| 947,467 | Brown | Jan. 25, 1910 |
| 1,154,765 | Harrison | Sept. 28, 1915 |
| 1,227,056 | King | May 22, 1917 |
| 1,337,968 | Schroeder | Apr. 20, 1920 |
| 1,480,802 | Bern et al. | Jan. 15, 1924 |
| 1,622,686 | Sutherland | Mar. 29, 1927 |
| 1,751,574 | Braaten et al. | Mar. 25, 1930 |
| 1,958,846 | Christensen | May 15, 1934 |
| 2,226,071 | Oldenburg | Dec. 24, 1940 |